United States Patent [19]

Koda et al.

[11] Patent Number: 5,701,189
[45] Date of Patent: Dec. 23, 1997

[54] WIRELESS DATA COMMUNICATION SYSTEM AND METHOD USING AN ELECTROLUMINESCENT PANEL

[75] Inventors: Rikki Koda, Delray Beach; Anthony James Dolezal, West Palm Beach, both of Fla.

[73] Assignee: Motorola, Inc., Schaumburg, Ill.

[21] Appl. No.: 411,427

[22] Filed: Mar. 27, 1995

[51] Int. Cl.$^6$ .................................................... H04B 10/00
[52] U.S. Cl. ................. 359/172; 359/145; 359/152; 455/151.2; 379/56; 348/751; 340/875.72; 345/76
[58] Field of Search ................. 359/113, 143, 359/145–146, 152, 172; 455/151.2; 379/56; 345/81, 76, 102, 104; 348/751, 761, 766, 790, 800; 340/825–44, 72; 382/211

[56] References Cited

U.S. PATENT DOCUMENTS

| | | |
|---|---|---|
| 4,500,173 | 2/1985 | Leibowitz et al. .................. 359/49 |
| 4,924,507 | 5/1990 | Chao et al. ........................ 382/211 |
| 5,327,229 | 7/1994 | Konno et al. ...................... 348/751 |
| 5,337,073 | 8/1994 | Tsunoda et al. ................... 345/76 |

*Primary Examiner*—Kinfe-Michael Negash
*Attorney, Agent, or Firm*—Pablo Meles; R. Louis Breeden; Philip P. Macnak

[57] ABSTRACT

A system (10) and method of communicating data utilizes an electroluminescent panel (12). The frequency of the drive signal for the electroluminescent panel (12) is modulated in accordance with data to be transmitted. The electroluminescent panel (12) is responsive to the drive signal to emit light at frequencies representing the data. A second electroluminescent panel (12') may be positioned adjacent to the first electroluminescent panel (12) to receive the data encoded light emitted therefrom. The second electroluminescent panel (12') generates a signal representing the received light, the signal being demodulated to recover the data encoded therein.

3 Claims, 4 Drawing Sheets

WIRELESS DATA COMMUNICATION SYSTEM AND METHOD USING AN ELECTROLUMINESCENT PANEL

FIELD OF INVENTION

The present invention relates to a system and method of providing wireless data communications and more particularly to such a system and method that utilizes an electroluminescent panel to transmit and receive data.

BACKGROUND OF THE INVENTION

Known methods of providing wireless data communications have included the use of an antenna as a transmitter/receiver element for a radio frequency (RF) signals. Other wireless data communication methods have utilized infrared radiation (IR), these methods requiring a photo-transmitter, such as a photodiode, that can be turned on and off very quickly to transmit the data. A photo detector detects the IR data transmitted from the photodiode to provide a signal representative thereof. However, each of these methods typically requires the addition of transmitter/receiver hardware to a device for which the wireless data communications are desired.

Although electroluminescent panels are known for emitting light, they have not been used as a photo-transmitter because electroluminescent panels typically cannot be turned on and off fast enough to transmit data in the manner that a photodiode can. Electroluminescent panels are typically used to provide a backlight for a liquid crystal display (LCD) such as described in U.S. Pat. No. 4,500,173. Electroluminescent panels are also known to be responsive to light incident thereto for providing a signal representative of the incident light as described in a Great Britain Patent Application 2 225 894 A and a Japanese Patent Application 63-281440. As described in these patent applications, the signal representing the light incident to the electroluminescent panel can be used to control the use of the electroluminescent panel itself. Specifically, if the signal representing incident light indicates that the ambient light is bright enough for the information depicted on the LCD to be easily seen, the electroluminescent panel is not lit. However, if this signal indicates that the ambient light is low, the electroluminescent panel is controlled to emit light so as to provide a backlight for the LCD.

SUMMARY OF THE INVENTION

In accordance with the present invention, the disadvantages of prior wireless data communication systems and methods have been overcome. The wireless data communication system and method of the present invention utilizes an electroluminescent panel that is controlled to emit light modulated with data. The electroluminescent panel may also be utilized as a receiver for receiving light that is modulated with data.

More particularly, the system and method of the present invention include the use of an electroluminescent panel for one-way data communication as either a transmitter or a receiver or for two-way data communications as both a transmitter and receiver. For data transmission, a modulator is provided to modulate the drive signal of the electroluminescent panel in accordance with data stored in a memory to thereby encode the data in the drive signal of the panel. The electroluminescent panel is responsive to the modulated drive signal to emit data modulated light. For receiving data, the electroluminescent panel is positioned adjacent to a source of data modulated light, the light having frequencies within the frequency range of the receiving electroluminescent panel. The receiving electroluminescent panel is responsive to the data modulated light incident thereto for providing a received signal representing the modulated light. A demodulator is coupled to the electroluminescent panel for demodulating the received signal to recover the transmitted data.

These advantages and novel features of the present invention, as well as details of an illustrated embodiment thereof, will be more fully understood from the following description and the drawings.

DESCRIPTION OF THE PREFERRED EMBODIMENT

Figure 1:
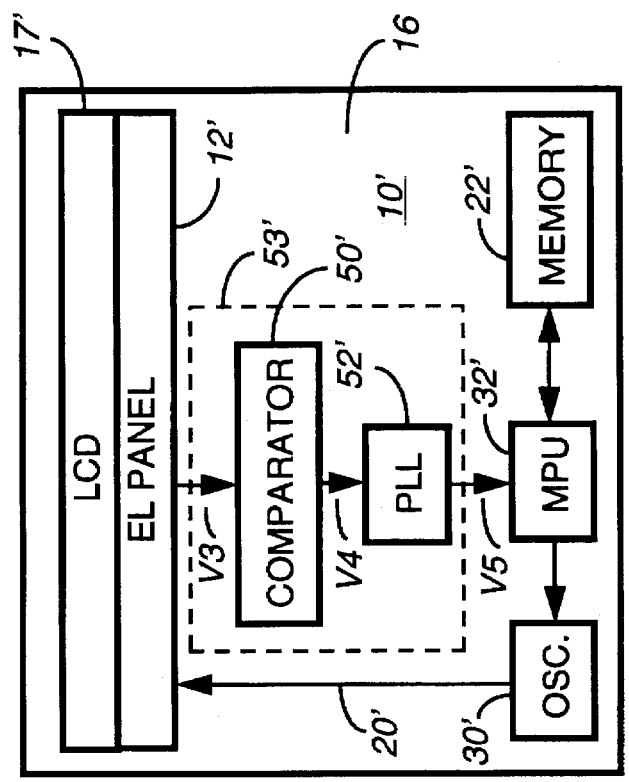
FIG. 1 is a block diagram illustrating first and second devices in data communication, each device having an electroluminescent panel and data communication system in accordance with one embodiment of the present invention.
Figure 1:
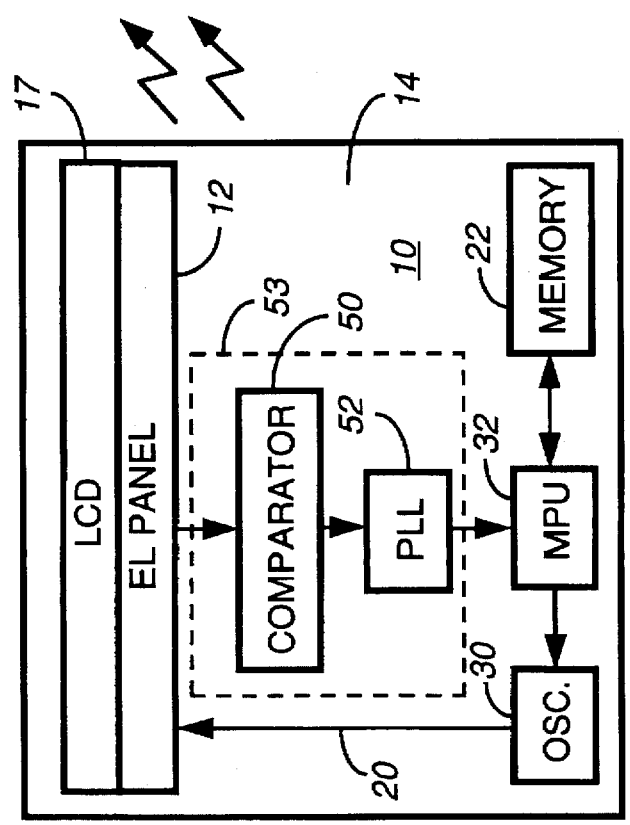

A data communication system 10 in accordance with the present invention is shown in FIG. 1. The system 10 utilizes an electroluminescent panel 12 that is included in each of a pair of devices 14 and 16 for providing a backlight for a respective LCD 17 and 17'. One or both of the devices 14 and 16 may be a selective call receiving device such as a pager as described in detail below with respect to FIG. 4. Alternatively, one or both of the devices 14 and 16 may be a laptop or notebook computer, an electronic data organizer, or any such device that includes an electroluminescent panel. In order for the device 14 to transmit data, the data communication system 10 modulates an electroluminescent panel drive signal, applied to the panel 12 on a line 20, with data that is stored in a memory 22. The electroluminescent panel 12 of the device 14 is responsive to the data modulated drive signal for emitting data modulated light. The device 16 is positioned adjacent to the device 14 so that the data modulated light emitted from the electroluminescent panel 12 of the device 14 falls incident to the electroluminescent panel 12' of the device 16. The electroluminescent panel 12' of the device 16 is responsive to the data modulated light incident thereto for providing a received signal representative of the modulated light. The device 16 demodulates the received signal representing the modulated light to recover the data transmitted from the device 14.

Figure 3:
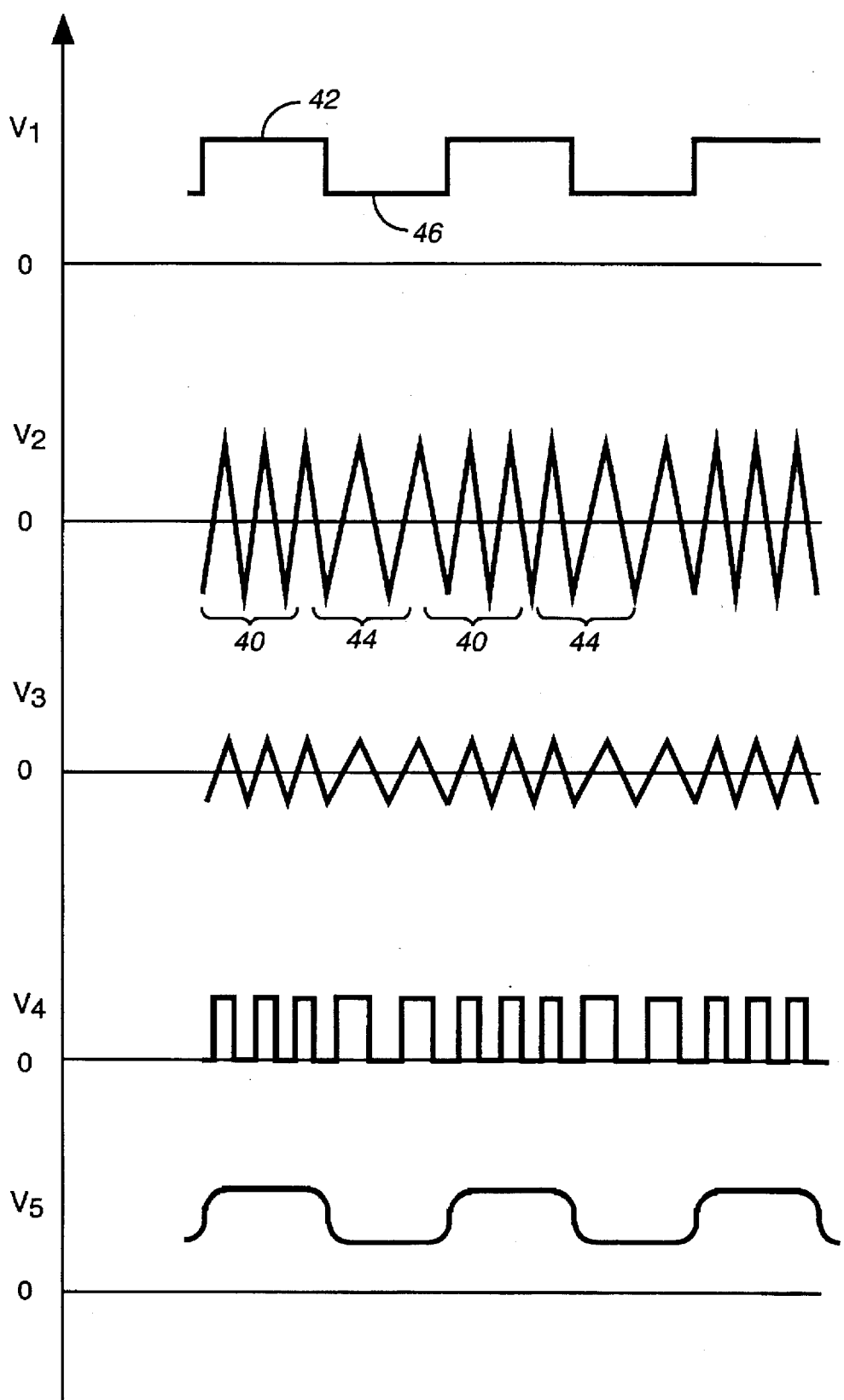
FIG. 3 illustrates a number of waveforms A–E generated by the system depicted in FIG. 1.

More particularly, in order to transmit data, a microprocessor 32 outputs to an oscillator 30 a data signal, $V_1$, an example of which is shown in FIG. 3. The oscillator 30 provides on line 20 a drive signal the frequency of which is modulated in accordance with the data represented by the data signal $V_1$. The frequency modulated drive signal $V_2$ output from the oscillator 30 is depicted in FIG. 3 as having a first signal portion 40 having a first frequency that is associated with, for example, a "1" bit represented by the high going portion 42 of the data signal $V_1$. The frequency modulated drive signal of the electroluminescent panel 12 also includes a second portion 44 having a second frequency, representing a "0" bit identified by the low going portion 46 of the data signal $V_1$. The drive signal $V_2$ that is frequency modulated in accordance with the data to be transmitted is applied to the electroluminescent panel 12. The electroluminescent panel 12 is responsive to the frequency modulated drive signal to emit light at frequencies corresponding to the frequencies of the first and second portions 40 and 44 of the drive signal $V_2$. The data modulated light emitted by the panel 12 of the device 14 is received by a second electroluminescent panel 12' such as contained in the device 16 when the second panel 12' is positioned adjacent to the first panel 12.

The electroluminescent panel 12' of the device 16 is responsive to light incident thereto to generate a signal representing the incident light, this received signal being depicted in FIG. 3 as $V_3$. The received signal, $V_3$, is applied to a comparator 50' or the like that compares the received signal $V_3$ to a threshold in order to convert the received signal to a pulsed waveform such as depicted in FIG. 3 as $V_4$. The pulsed waveform $V_4$ representing the received signal is applied to a phase locked loop 52' that forms with the comparator 50' a demodulator 53'. The demodulator 53' demodulates the signal $V_4$ to recover a data signal such as depicted in FIG. 3 as $V_5$, the data signal $V_5$ representing the data transmitted from the device 14. A microprocessor 32' is responsive to the received data signal $V_5$ to store data representative thereof in a memory 22' so that the microprocessor 32' can control various functions and operations of the device 16 in accordance with the received data as described in detail below.

It is noted, that each of the devices 14 and 16 may be provided with the circuitry necessary for both the transmission and reception of data utilizing an electroluminescent panel as shown in FIG. 1. Alternatively, each of the devices 14 and 16 may be configured so as to form only a transmitter or a receiver for one way communication as will be apparent to one of ordinary skill in the art.

Figure 2:
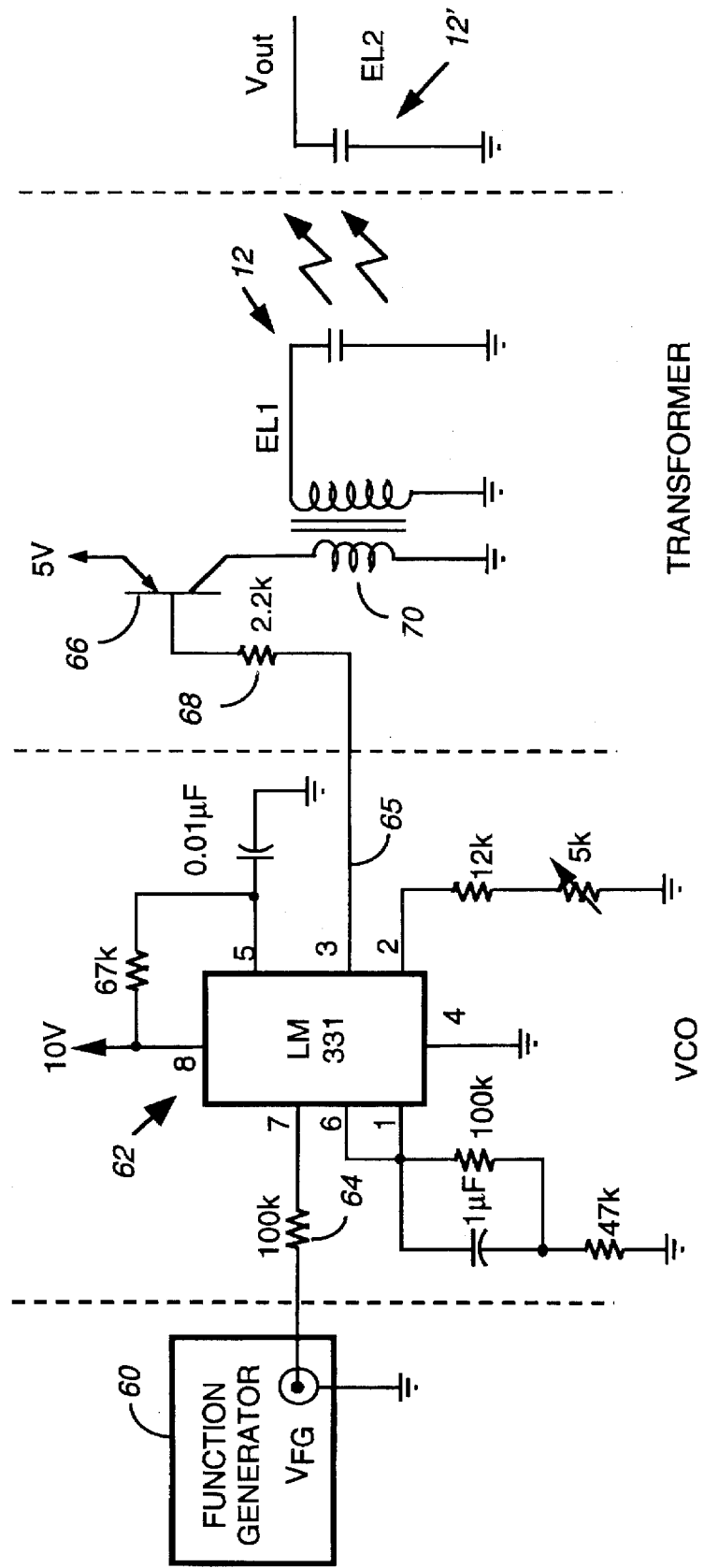
FIG. 2 is a circuit diagram illustrating the details of one embodiment of the data transmission portion of the data communication system of FIG. 1.

The transmitter control portion of one embodiment of the data communication system 10 is shown in greater detail in FIG. 2. The data signal representing the data to be transmitted via an electroluminescent panel 12 is output from a function generator 60 that may take the form of the microprocessor 32 and memory 22 as described above. The data signal from the function generator 60 is coupled to a voltage controlled oscillator 62 via a 100 k resistor 64. The voltage controlled oscillator is responsive to the data signal to provide, at the output thereof on a line 65, a drive signal the frequency of which varies in accordance with the data represented by the data signal. This frequency modulated drive signal is coupled to the base of a transistor 66 via a 2.2 k resistor 68. The transistor 66 in turn couples the frequency modulated drive signal to a transformer 70 to provide a voltage gain prior to being applied to the electroluminescent panel 12. The electroluminescent panel 12 is responsive to the frequency modulated drive signal to emit light at frequencies of which represent the data being transmitted. The light emitted from the electroluminescent panel 12 is then picked up by the an electroluminescent panel 12' when positioned adjacent to the panel 12 as described above.

It is noted that another embodiment of the transmitter control portion may utilize only the microprocessor 32 itself to provide the data modulated drive signal to the electroluminescent panel in order to eliminate the oscillator and associated circuitry of FIG. 2. In such an embodiment the microprocessor would provide a drive signal at a first frequency to represent a "1" bit and a drive signal at a second frequency to represent a "0" bit.

The data communication system 10 of the present invention utilizing an electroluminescent panel 12 may easily be incorporated into any device that currently utilizes an electroluminescent panel to, for example, backlight a LCD. One example of such a device 14, 16 is illustrated at block 110 in FIG. 4 as a pager. The pager 110 is illustrated as receiving radio frequency (RF) signals from a paging network 112. The paging network 112 includes a paging controller 114 that receives input messages or page initiation messages from an input device such as a telephone 116. The paging controller 114 generates a paging message in accordance with a particular signaling protocol such as FLEX. The paging message is coupled from the paging controller 14 to a RF transmitter/receiver 118. The RF transmitter/receiver 118 transmits the paging message via an antenna 120 for reception by a particular pager 110 in accordance with an identification of the particular pager that is included in the paging message.

The pager 110 includes an antenna 122 for intercepting transmitted RF signals. The antenna 122 couples the received signals to a receiver 124 that includes a demodulator 125 and an analog to digital convertor 127. The receiver 124 produces a data stream representative of a demodulated received signal that is coupled to a decoder/controller 126. The decoder/controller 126 includes a processor such as the microprocessor 32, for processing the demodulated signal information in accordance with software stored in a read only memory (ROM) 130. A random access memory (RAM) 132 is utilized to store variables that are derived during processing and to store the decoded paging message information received by the pager 110. The information to be transmitted by the electroluminescent panel 12 associated with the display 17 may be stored in either the RAM 132 or the ROM 130, for example. A baud detector 134 is coupled to the decoder/controller 126 in order to detect the baud rate of a received paging signal as is well known in the paging art. A power switch 136 is also coupled to the decoder/controller 126 in order to control the supply of power to the receiver 124 thereby providing a battery saving function.

The RF signals transmitted by the network 112 for paging applications typically include a receiver address that identifies a particular pager 110 as well as an associated alpha and/or numeric message. The decoder/controller 126 decodes a received address by comparing it with one or more addresses stored in a code plug or code memory 138. If the decoder/controller 126 detects a match between a received address and a stored address, an alert signal is generated to alert a user that a paging message has been received by the pager 110. The alert signal is directed to an audible alerting device 140 for generating an audible alert or to a tactile alerting device 142 for generating a silent, vibrating alert. Switches 44 allow the user of the pager 110 to, among other things, select between the audible alert 140 and the tactile alert 142 and to cause a message stored in the RAM 132 to be accessed for display on the display 17. One of the switches 144 may also be actuated by a user to put the pager 110 in either an electroluminescent panel receiver mode or an electroluminescent panel transmitter mode.

Figure 4:
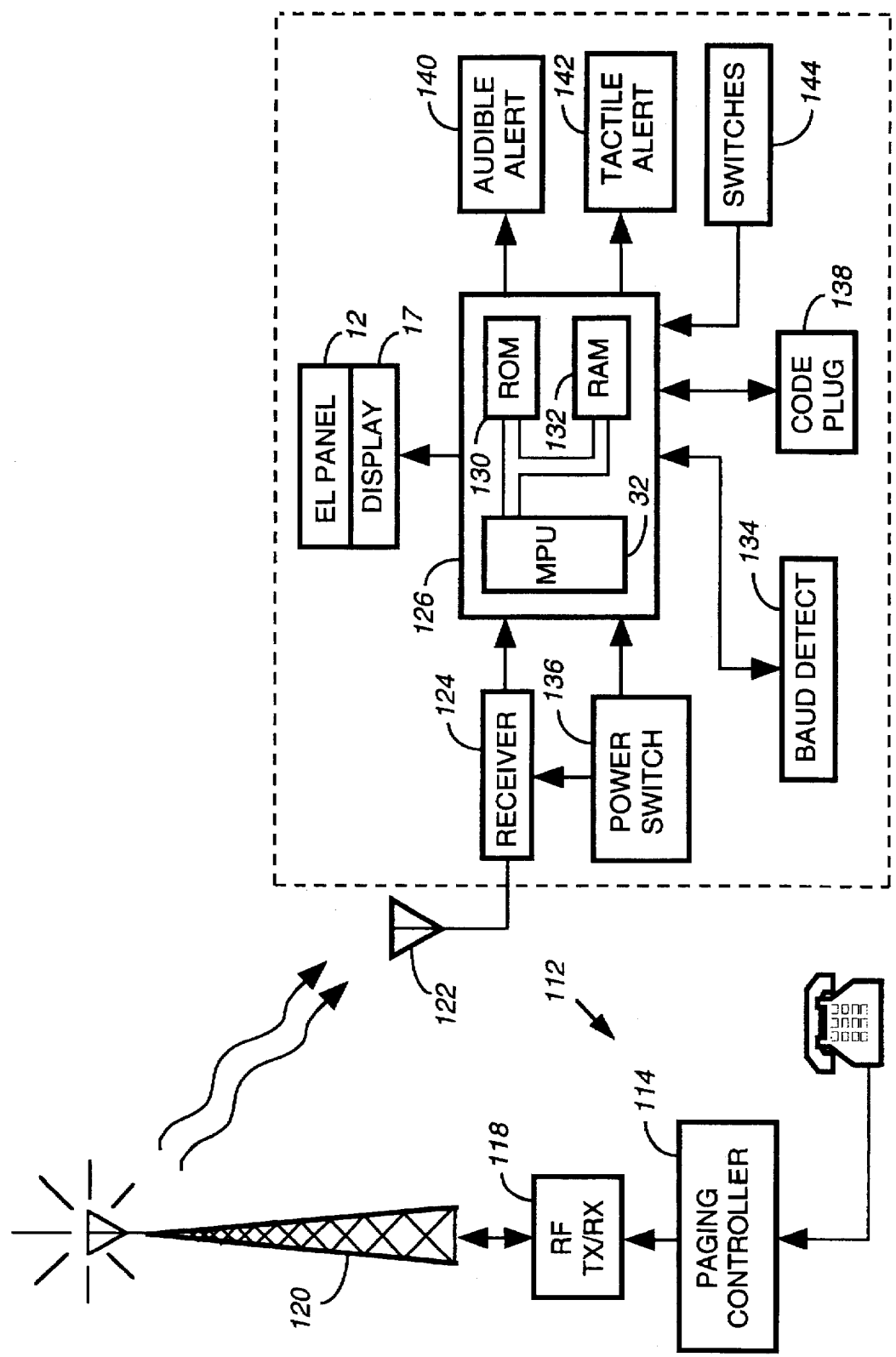
FIG. 4 is a block diagram illustrating a paging network including a pager that incorporates the data communication system of FIG. 1.

In accordance with the present invention, a pair of pagers such as shown in FIG. 4 that includes the data communication system 10 shown in FIG. 1 can transfer data therebetween without requiring an electrical connection. A pager that includes only the electroluminescent transmitting portion of the data communication system 10 allows data to be easily retrieved and input to another electrical device. Further, a pager that includes only the electroluminescent receiving portion of the data communication system 10 has a number of applications as well. For example, a test station that includes a light source emitting light within the frequency range of the electroluminescent panel 12 of a pager can communicate test commands to the pager without a hard wire interface, these test commands being received by the pager in a noninvasive manner so that various functions of the pager can be accurately checked. For example, the microprocessor 32 of the pager, upon receiving data via the electroluminescent panel 12 that identifies an LCD test, may respond to the LCD test command data by controlling the display 17 to light various segments of the LCD so that the operation of the display may be checked. Another test command that can be communicated to the pager via the electroluminescent panel 12 may include an audio test command to which the microprocessor 32 responds by, for example, controlling the audible alert generator 140 to emit audio at various sound pressure levels. After audio testing the pager can be programmed via the electroluminescent panel to operate the audio at one or more desired sound pressure levels in accordance with the transmitted data. The microprocessor 32 responds to the receipt of such programming data by storing the data in the appropriate location of the RAM 132. Further, various RF tests, such as a pager sensitivity test, can be performed noninvasively utilizing the electroluminescent panel 12 to communicate with the pager's microprocessor 32. Heretofore, these tests were invasive tests requiring the pager to be opened for access to various pins contained therein. The likelihood of inaccurate test results is greater for invasive tests than for noninvasive tests. Further, in order to eliminate the programming fixture necessary to program the code plug memory 138, the electroluminescent panel 12 and associated circuitry may be utilized to receive pager address information for storage in the memory 132 or the like so that the pager's address or addresses can be easily modified. A pager address programmed into the pager in accordance with this method can easily be ascertained by transmitting, via the electroluminescent panel 12, a message to command the microprocessor 32 to retrieve the pager address from the RAM 132 and to transmit the retrieved address back out of the pager via the electroluminescent panel 12.

Although the data communication system 10 of the present invention has been described in detail for a pager, it is suitable for use in any device where wireless data communications for over short distances are desired. Many modifications and variations of the present invention are possible in light of the above teachings. Thus, it is to be understood that, within the scope of the appended claims, the invention may be practiced otherwise than as described hereinabove.

What is claimed is:

1. A system for providing wireless data communications comprising:

an electroluminescent panel having a drive signal with a frequency;

a memory for storing data; and a frequency modulator for modulating the frequency of the drive signal of said electroluminescent panel in accordance with data stored in said memory to encode said data as a plurality of frequencies of said drive signal, said electroluminescent panel being responsive to said frequency modulated drive signal to emit light at a plurality of frequencies representative of said data, wherein said frequency modulator includes an oscillator that is responsive to a signal representing said stored data to provide said frequency modulated drive signal.

2. A system for providing wireless data communications as recited in claim 1, wherein said frequency modulator includes:

a transformer to couple said frequency modulated drive signal to said electroluminescent panel to drive the panel.

3. A system for providing wireless data communications as recited in claim 1 wherein said frequency modulator includes a processor that is responsive to said stored data of a first type for providing said electroluminescent drive signal at a first frequency and that is responsive to stored data of a second type to provide said electroluminescent drive signal at a second frequency.

* * * * *